United States Patent
Wang et al.

(10) Patent No.: US 12,063,543 B2
(45) Date of Patent: Aug. 13, 2024

(54) NETWORK NODES AND METHODS SUPPORTING MULTIPLE CONNECTIVITY

(71) Applicant: TELEFONAKTIEBOLAGET LM ERICSSON (PUBL), Stockholm (SE)

(72) Inventors: Jun Wang, Nanjing (CN); Haomin Li, Kanata (CA); Xixian Chen, Ottawa (CA); Fuzheng Chen, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 181 days.

(21) Appl. No.: 17/424,277

(22) PCT Filed: Jan. 21, 2019

(86) PCT No.: PCT/IB2019/050496
§ 371 (c)(1),
(2) Date: Jul. 20, 2021

(87) PCT Pub. No.: WO2020/152497
PCT Pub. Date: Jul. 30, 2020

(65) Prior Publication Data
US 2022/0078661 A1    Mar. 10, 2022

(51) Int. Cl.
*H04W 28/02*    (2009.01)
*H04L 47/34*    (2022.01)

(52) U.S. Cl.
CPC ........ *H04W 28/0263* (2013.01); *H04L 47/34* (2013.01)

(58) Field of Classification Search
CPC ..... H04L 1/1825; H04L 1/1841; H04L 47/34; H04W 28/02; H04W 28/0263; H04W 76/15; H04W 76/16; H04W 80/02; H04W 92/20
See application file for complete search history.

(56) References Cited

U.S. PATENT DOCUMENTS

| 2013/0176988 A1* | 7/2013 | Wang ................ H04L 5/0007 370/331 |
| 2016/0142939 A1* | 5/2016 | Yi ...................... H04W 74/06 370/329 |

(Continued)

FOREIGN PATENT DOCUMENTS

EP    3340720 A1    6/2018

OTHER PUBLICATIONS

ISR and WO for PCT/IB2019/050496, Year: 2019.
3GPP TS 38.425 V15.2.0 NG-RAN NR user plane protocol (Release 15), Year: 2018.

*Primary Examiner* — Pao Sinkantarakorn
(74) *Attorney, Agent, or Firm* — Sage Patent Group

(57) ABSTRACT

A method in a first network node, which comprises a primary Radio Link Control (RLC) entity is provided. The method comprises: receiving packets from a PDCP entity and sending packets to a PDCP entity; separating the received packets into at least a first group and a second group; assigning sequence numbers to the packets of the first group from a sequence number range allocated to at least one the secondary RLC entity in a second network node, the at least one secondary RLC connected to the primary RLC entity through a RLC channel; sending the packets of the first group with the assigned sequence numbers to the at least one secondary RLC entity.

11 Claims, 15 Drawing Sheets

(56) References Cited

U.S. PATENT DOCUMENTS

| | | | |
|---|---|---|---|
| 2016/0183103 A1* | 6/2016 | Saily | H04W 36/02 |
| | | | 370/216 |
| 2016/0219594 A1* | 7/2016 | Uchino | H04W 76/15 |
| 2017/0048775 A1* | 2/2017 | Kim | H04W 16/28 |
| 2020/0113013 A1* | 4/2020 | Kim | H04W 80/08 |
| 2020/0119864 A1* | 4/2020 | Xu | H04W 76/15 |

* cited by examiner

NETWORK NODES AND METHODS SUPPORTING MULTIPLE CONNECTIVITY

TECHNICAL FIELD

The present description generally relates to wireless communication systems and more specifically to support multiple connectivity in the wireless communication systems.

BACKGROUND

When considering the evolution roadmap from Long Term Evolution (LTE) to fifth generation (5G), 5G will coexist with LTE for a long time. As such, a User Equipment (UE) will need to support New Radio (NR) and LTE to access the two technologies simultaneously. To fully utilize the two access technologies, third Generation Partnership Project (3GPP) Release-15 introduced the dual-connectivity structure 100 as illustrated in FIG. 1.

In FIG. 1, it can be seen that the UE 105 establishes two radio links with base stations/network nodes, one with gNB 110 and another with eNB 115 respectively. The two radio links have independent air interface resources and respective scheduler. With cloud infrastructure introduced in the Radio Access Network (RAN), non-real time processing, such as Packet Data Convergence Protocol (PDCP) 140 and Radio Resource Control (RRC) 145 is removed from the gNB 110 and deployed remotely in the cloud. However, the real-time processing, such as Radio Link Control (RLC), is still located within gNB 110 to shorten the Round Trip Time (RTT) delay during Transmission Time Interval (TTI) scheduling. Accordingly, a new standard interface, referred to as F1, is defined between the cloud infrastructure and gNB 110 and eNB 115 to facilitate the interaction among different vendors. More specifically, F1-User (F1-U) 150 is provided for user data and F1-Control (F1-C) 155 is provided for control data.

The UE 105 comprises different protocol stack layers, such as PDCP 120, RLC 125, MAC 130 and Physical layer 135. The gNB 110 and eNB 115 have corresponding similar layers (Physical layer 160, MAC layer 165, and RCL layer 170).

At downlink (DL), when user data come from the core network, they first arrive at the PDCP layer 160. The PDCP entity (at the PDCP layer) needs to record the user data in its local buffer (packet buffer (PB) 175) for future packet forwarding, and to split the user data into two streams according to a specific algorithm for the dual connectivity. Then, the PDCP layer/entity feeds the split user data to the gNB and eNB, respectively through the F1-U interfaces for DL air interface scheduling.

At uplink (UL), the user data received by the gNB and eNB from the air interface are also delivered to the PDCP layer, which then needs to reorder the user data from the two streams according to the PDCP Sequence Number (SN). Then, the PDCP layer sends the in-sequence user data to the core network.

SUMMARY

Although the simultaneous utilization of two radio links can help to improve UE's throughput, the existing dual-connectivity solution has the following defects:

1. Extra Burden in PDCP and F1-U Interface

From the point of view of the protocol stack model, the PDCP and RLC layers have clear functionality boundaries, i.e. the PDCP layer is responsible for the presentation layer related work, such as Robust Header Compression (ROHC), integrity check, encryption/decryption. The RLC layer is responsible for the transportation layer work, such as segmentation, concatenation as well as acknowledgement and retransmission, for example.

However, with the introduction of dual-connectivity in 5G, the PDCP layer, as an anchor point, has to implement the following additional functionalities:

Maintain its Local Data Buffer for Both DL and UL Packets:

Although the RLC's Automatic Repeat request (ARQ)'s mechanism provides a reliable data transportation, the PDCP layer still has to buffer the incoming data for potential packet forwarding, for example, once one Radio Link (RL) becomes unavailable or a handover occurs. Such data buffering can consume a large volume of memory, and impose a heavy burden to the PDCP layer and the F1 interface.

Reorder the Out-of-Order PDCP Packets Received from the gNB and eNB:

In LTE, the RLC layer can provide in-sequence data delivery so that the PDCP layer doesn't care about the data sequence at all. However, with dual-connectivity in 5GNR, such in-sequence data delivery disappears, since the UE randomly sends data through two air radio links: the RLC entity in one node cannot see the corresponding RLC entity in the other node nor guarantee the received PDCP packet order just by itself. Therefore, the RLC entity has to rely on PDCP in the cloud to reorder the out-of-order PDCP packets received from the gNB and eNB respectively, which inevitably complicates the PDCP implementation.

Split Traffic According to Air Channel Quality:

As an anchor, the PDCP layer needs to split the traffic volume between the two radio links in DC. To match the throughput of the two radio links, the PDCP layer needs to learn the channel quality of the two radio links based on the report sent through the F1 interface, and predict the throughput based on the previous experience, which further imposes burden to the PDCP layer.

Furthermore, the F1 interface also suffers from the following additional load, besides the normal user traffic:

ACKnowledgment (ACK) of DL Packet:

Since the PDCP layer buffers a duplicate copy of DL packets, the gNB or eNB needs to feedback acknowledgement over the F1 interface for the PDCP layer to release its local buffer once the PDCP packets have been confirmed by the UE via RLC ACK.

Channel Quality Report:

The gNB or eNB needs to periodically deliver their respective radio link channel quality report for the PDCP layer to dynamically adjust the traffic split ratio, or to remove or add radio links depending on the channel quality (e.g. if it falls below or not a threshold).

Also, the user traffic volume will put an additional burden on the PDCP layer and F1 interface, as the traffic in 5G will be 100 times more compared to that of LTE.

As such, an ideal solution should keep the PDCP layer focused on its own presentation level work (RObust Header Compression (ROHC), integrity or encryption/decryption) by encapsulating the transport layer functionality within the RLC layer. As a result, the PDCP layer implementation is simplified and the load in the F1 interface is released.

2. Duplicate PDCP Deployment

According to the 3GPP TS. 38.425, the user data are carried on the F1-U interface having the following protocol stack: GPRS Tunneling Protocol-User Planel User Datagram Protocol|Internet Protocol (GTP-U|UDP|IP). The Radio Resource Control (RRC) signaling is carried on the F1-C interface having the following protocol stack: Stream Control Transmission Protocol|Internet Protocol (SCTP|IP). It should be noted that both user data and RRC signaling need to go through the PDCP layer for decryption. In other words, the F1-U and F1-C interfaces need to deploy the PDCP layer, either at the gNB side or at the RRC cloud side. Regardless of which side, this results in separated PDCP deployments for RRC signaling processing and user traffic processing respectively. This kind of deployment decreases the resource efficiency and increases the deployment complexity.

An ideal solution should support single PDCP deployment, which can greatly simplify RAN deployment effort.

3. Bundle RLC Logic with Underlying Radio Link

From the RAN protocol perspective, the RLC layer doesn't have to be co-located with the MAC/PHY layer. However, the RLC layer needs to remain co-located with the radio link (RL) scheduler due to the unacceptable RTT delay in the F1 interface otherwise. In LTE, the interval between the scheduling instruction and Transport Block (TB) ready for physical processing is required to be below 1 ms (even shorter in 5G). However, the RTT transport delay in the F1 interface can be up to 20 ms. Such a long RTT delay implicitly imposes that the RLC entity must stay as close as possible to the location of the scheduler, i.e. in the same node. This however results in a side effect, i.e. the RLC entity has to be tightly bundled with the underlying radio link. In other words, the same number of RLC entities and radio links has to be deployed in multiple nodes. Furthermore, all RLC Packet Data Units (PDUs) from one RLC entity cannot go through any other radio links, even if its corresponding RL is very poor or even unavailable and the other RLs are better. Such an unnecessary bundling between RLC entities and the underlying RLs decreases the flexibility and increases the radio link failure (RLF) probability.

An ideal solution should decouple the RLC entity from the underlying radio links, which leads to increase RL efficiency and decrease RLF probability.

4. Duplicate RLC Entities in UE

Per above item 3, the RLC bundling with RL is due to the long RTT delay in the F1 interface. However, at the UE side, there is no such delay issue, i.e. the UE's RLC entity doesn't have to be bundled with its RL at all. Unfortunately, in order to communicate with the network node RLC peers smoothly, the UE has to also maintain two separate RLC entities for each radio bearer. This will increase the 5G UE's implementation complexity and cost.

An ideal solution should allow for the UE to keep only one RLC entity for each radio bearer regardless of the number of radio links that are supported.

Embodiments of the present disclosure allow to mitigate the above drawbacks.

According to a first aspect, some embodiments include a method performed by first network node, which comprises a primary RLC entity.

In some embodiments, the method may comprise: receiving packets from a PDCP entity; separating the received packets into at least a first group and a second group; assigning sequence numbers to the packets of the first group from a sequence number range allocated to at least one secondary RLC entity in a second network node, the at least one secondary RLC connected to the primary RLC entity through a Radio Link Control (RLC) channel; sending the packets of the first group with the assigned sequence numbers to the at least one secondary RLC entity.

According to a second aspect, some embodiments include a network node configured, or operable, to perform one or more functionalities (e.g. actions, operations, steps, etc.) of the first network node as described herein.

In some embodiments the first network node may comprise one or more communication interfaces configured to communicate with one or more other radio nodes and/or with one or more network nodes, and processing circuitry operatively connected to the communication interface, the processing circuitry being configured to perform one or more functionalities of the first network node as described herein. In some embodiments, the processing circuitry may comprise at least one processor and at least one memory storing instructions which, upon being executed by the processor, configure the at least one processor to perform one or more functionalities of the first network node as described herein. In some embodiments, the first network node may comprise a primary RLC entity having the processing circuitry and interfaces to perform the described functionalities.

In some embodiments, the first network node may comprise one or more functional modules configured to perform one or more functionalities of the first network node as described herein.

According to a third aspect, some embodiments include a non-transitory computer-readable medium storing a computer program product comprising instructions which, upon being executed by processing circuitry (e.g., at least one processor) of the first network node, configure the processing circuitry to perform one or more functionalities of the first network node as described herein.

According to a fourth aspect, some embodiments include a method performed by a second network node, which comprises at least one secondary RLC entity.

In some embodiments, the method comprises: receiving packets from a primary RLC entity in a first network node, the packets being assigned with sequence numbers from a range of sequence numbers allocated to the at least one secondary RLC entity, wherein the primary RLC entity is connected to the at least one secondary RLC entity through a Radio Link Control (RLC) channel; and sending the packets to a wireless device.

According to a fifth aspect, some embodiments include a network node configured, or operable, to perform one or more functionalities (e.g. actions, operations, steps, etc.) of the second network node as described herein.

In some embodiments, the second network node may comprise one or more communication interfaces configured to communicate with one or more other radio nodes and/or with one or more network nodes, and processing circuitry operatively connected to the communication interface, the processing circuitry being configured to perform one or more functionalities of the network node as described herein. In some embodiments, the processing circuitry may comprise at least one processor and at least one memory storing instructions which, upon being executed by the processor, configure the at least one processor to perform one or more functionalities of the second network node as described herein. In some embodiments, the second network node may comprise at least one secondary RLC entity having the processing circuitry and interfaces to perform the described functionalities.

In some embodiments, the second network node may comprise one or more functional modules configured to perform one or more functionalities of the network node as described herein.

According to a sixth aspect, some embodiments include a non-transitory computer-readable medium storing a computer program product comprising instructions which, upon being executed by processing circuitry (e.g., at least one processor) of the second network node, configure the processing circuitry to perform one or more functionalities of the second network node as described herein.

According to a seventh aspect, some embodiments include a method in a communication system including at least a first network node and a second network node, the first network node comprising a primary Radio Link Control (RLC) entity and the second network node comprising at least one secondary RLC entity.

In some embodiments, the method comprises: at the primary RLC entity, receiving packets from a wireless device; at the at least one secondary RLC entity, receiving packets from the wireless device and forwarding the packets to the primary RLC entity; at the primary RLC entity, re-ordering the packets received from the wireless device and the at least one secondary RLC entity and sending the packets in order to a Packet Data Convergence Protocol (PDCP) layer; wherein the primary RLC entity is connected to the at least one secondary RLC entity through a Radio Link Control (RLC) channel.

According to a seventh aspect, some embodiments include a wireless device, which needs only one RLC entity configured to perform one of receiving packets from one primary RLC entity and at least one secondary RLC entity in one or more network nodes and sending packets to the primary RLC entity and the at least one secondary RLC entity.

Compared with the existing dual-connectivity systems, the embodiments of this disclosure present a general multi-RL structure which has the following advantages:

1) Single PDCP Deployment

The composite transport stack can provide both unreliable and reliable transmissions using the existing GTP-U operation interface so that the RRC signaling can be transparently carried on the F1-U interface. This fulfills a single PDCP deployment in the cloud.

2) Offload F1-U Interface

Through encapsulating all air interface related transmission behavior (such as traffic split, in-sequence delivery, reroute status update) into the RLC layer, the PDCP layer can be only focused on its own representation related functionality so that the additional control information, such as acknowledgement of PDCP packet reception and channel quality reports, are offloaded from the F1-U interface. As such, the F1-U interface only needs to carry pure payload for a radio bearer, i.e. user traffic and RRC signaling.

3) More Accurate Traffic Split to Match Channel Quality of Underlying Radio Links Compared with the PDCP entity, the RLC entity located within the gNB is closer to the air interface. As such, the RLC entity can respond to channel fluctuations in the air interface more quickly than the PDCP entity. Then, the RCL entity can adjust the traffic split ratio and achieve a better match between the traffic volume and radio link quality.

Moreover, a new RLC forwarding channel can be implemented as a proprietary interface and can provide more flexibility than the existing public F1-U interface. As such, the new channel can support optimized channel quality estimation algorithms in the future.

4) Unify Scheduling Behavior Under all Multi-RL Scenarios

By decoupling the RLC entity from the radio link, all the gNBs have their own local RLC entities available, which then lays down the same foundation for all the MAC/PHY schedulers in different nodes and unifies the scheduling behavior under multi-RL scenarios into a uniform pattern.

5) Simplify UE Implementation Cost

By combing multiple distributed RLC entities into a logic RLC entity, the network side presents a logic RLC view to the UE so that only a single RLC entity is needed for each radio bearer regardless of the number of radio links that are supported and takes care of radio link addition or removal. This can decrease the UE's implementation cost.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 1:
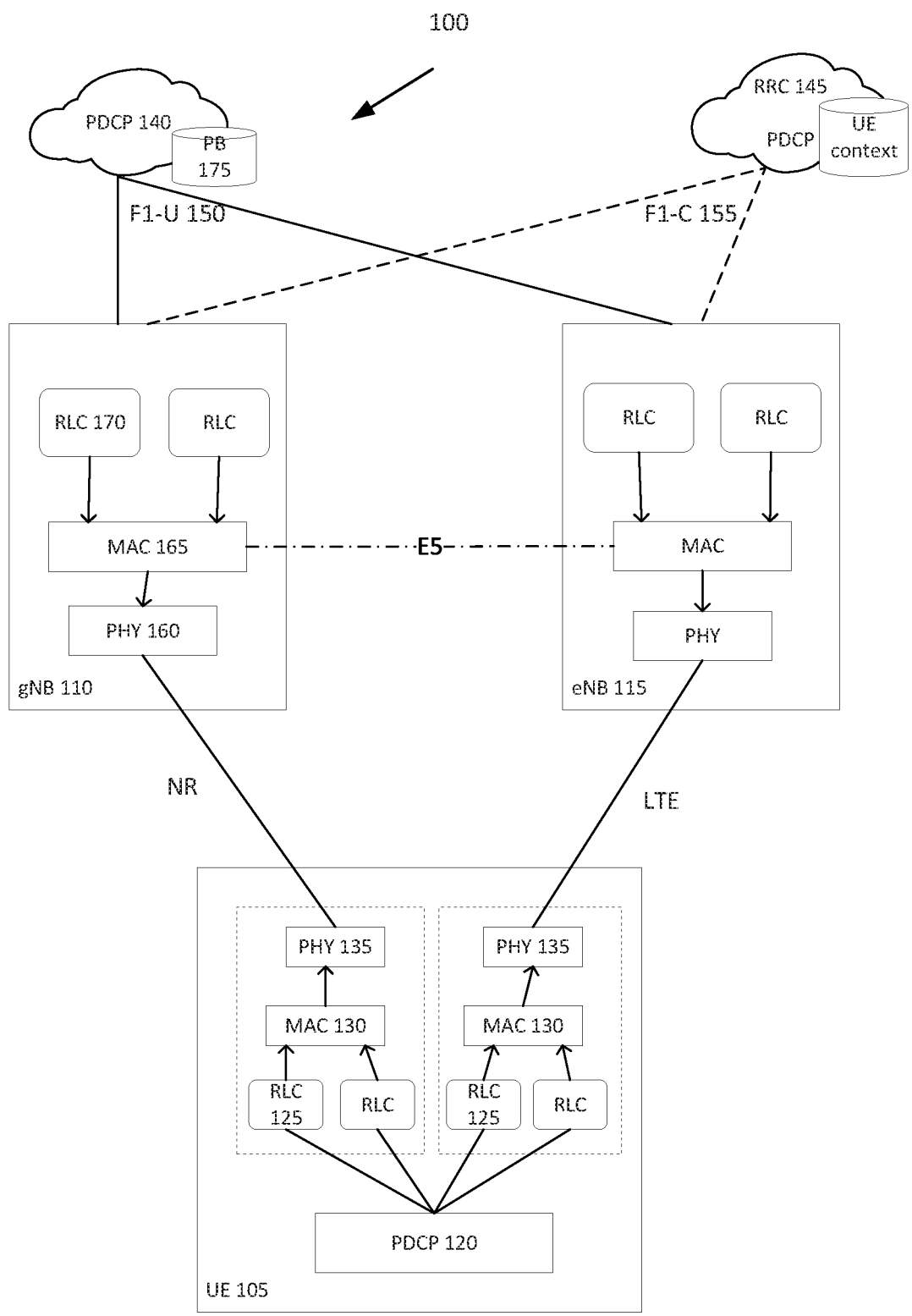
FIG. 1 illustrates a dual-connectivity structure.
Figure 2:
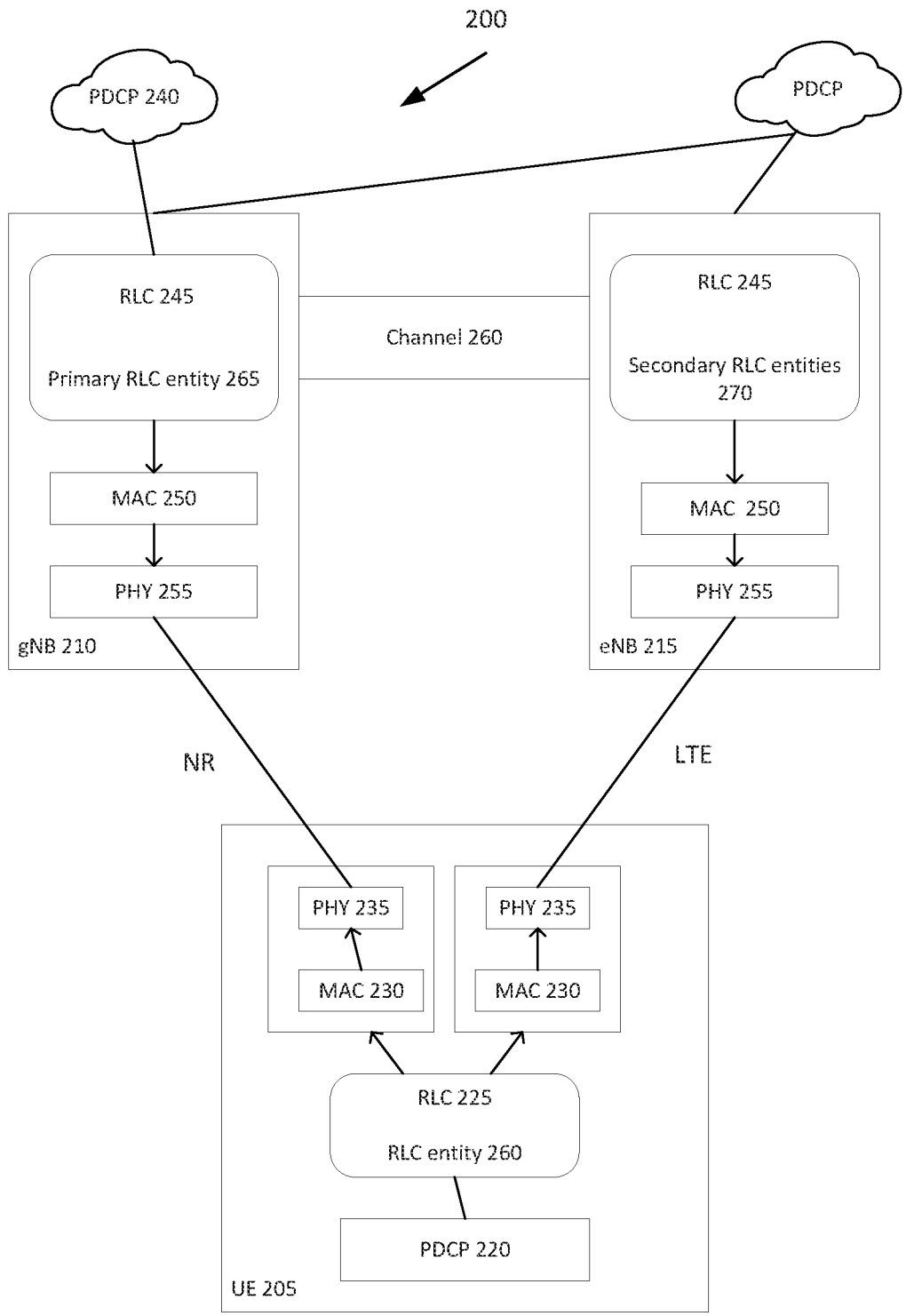
FIG. 2 illustrates a dual-connectivity structure according to an embodiment of the present disclosure.

It should be noted that the dual-connectivity is actually just a special case of the general multi-RL model (or multiple connectivity), which not only supports all functionalities of dual-connectivity, but also can be easily expanded to cover other scenarios, such as inter-gNB carrier aggregation (multiple links used simultaneously) or handover (multiple links used exclusively). FIG. 2 illustrates a network system 200 that can resolve all the existing defects in the general multi-RL model. Generally stated, embodiments of this disclosure combine multiple RLC entities in different nodes belonging to the same radio bearer into a logic RLC entity.

Now turning to FIG. 2, the network system 200 in dual-connectivity will be described in more detail. The network system 200 may comprise a wireless device or User Equipment (UE) 205, a base station (or network node) for New Radio (NR), called gNB 210 and a base station for LTE or other technologies (GSM, CDMA, etc.), called eNB 215. The UE 205 can be connected to both of the network nodes 210 and 215, in a dual connectivity mode.

In the UE 205, different stack protocol layers are illustrated. For example, there is a PDCP layer 220, a RLC layer 225, a MAC layer 230 and a PHY (physical) layer 235. It should be noted that the UE has a MAC layer 230 and a PHY layer 235 for each connectivity (with the gNB and eNB). The network nodes 210 and 215 have corresponding layers, such as PDCP layer 240, RLC layer 245, MAC layer 250 and Physical layer 255. It should be noted that the PDCP layer 240 can be part of the cloud infrastructure.

In the RLC layer 225 of the UE 205, one RLC entity 260 can be used for each radio bearer regardless of the number of underlying RLs established with the network nodes 210 and 215. As an example, only one RLC entity (for one radio bearer) is illustrated, but there may be several RLC entities corresponding to several different radio bearers.

For the RLC layer 245 of the network nodes 210 and 215, there may be a plurality of RLC entities, co-located with their respective radio link schedulers for example. The RLC entities of gNB 210 can interact with the RLC entities of eNB 215, through an interface or channel 260, which can be an enhanced data interface, for example. By so doing, the RLC entities from different network nodes can construct a logic RLC entity from the UE's perspective, by sharing the same RLC Sequence Number (SN) space, for example. The logic RLC entity can be referred to as the primary RLC entity.

More specifically, to entities outside the logic RLC entity, the logic RLC entity encapsulates the internal interaction among the plurality of RLC entities and exposes the same operation interface as one existing RLC entity. This means that only one RLC SN space and one set of RLC parameters are used to accept incoming PDCP PDUs and provide in-sequence data delivery to the PDCP layer so that all the external entities (PDCP, UE) see the logic RLC entity as the existing RLC entity.

Within the logic RLC entity, the multiple real RLC entities are still co-located with their respective radio link schedulers in different network nodes in order to avoid long RTT delay. Among those entities, one RLC entity is chosen as the primary RLC entity and the others as secondary RLC entities. For example, FIG. 2 illustrates a primary RLC entity 265 in gNB 210, which is connected with the other RLC entities, referred to as secondary RLC entities 270 in eNB 215, through the channel 260.

All the RLC entities have the segmentation, concatenation and ARQ functionalities.

However, the primary RLC entity 265 may also have the following functionalities:

The Primary RLC entity 265 can offer a RLC interface towards the external entities, allocate RLC SN from a single SN space to the secondary RLC entities and perform Packet forwarding of RLC PDUs (data and control) among the RLC entities.

The secondary RLC entity 270 may also have the following functionalities:

The secondary RLC entity 270 can reroute RLC PDUs (status update or UL data PDUs) to the Primary RLC entity and send a feedback channel quality report to the Primary RLC entity.

Compared with the existing dual-connectivity solutions, the embodiments of this disclosure move the anchor point from the PDCP layer down to the Primary RLC entity, which represents the logic RLC entity. As such, the PDCP layer/entity doesn't have to maintain its local buffer nor provide the re-ordering functionality, since only one connectivity is established between the PDCP layer and the Primary RLC entity. The secondary RLC entities are invisible to the PDCDP layer. When the traffic comes from the core network, the PDCP layer can just focus on its representation layer work, such as ROHC, integrity and encryption. After such processing is done, the PDCP layer sends the PDCP PDUs to the primary RLC entity without recording a duplicate copy in its local buffer. At UL, since the primary RLC entity provides the in-sequence delivery, the PDCP layer doesn't have to re-order the received PDCP PDUs. Thus, the PDCP layer just performs the decryption and delivers them to the core network.

Upon receiving PDCP PDUs, the primary RLC entity can determine the traffic split ratio between a first connectivity/ radio link (e.g. gNB 210) and a second connectivity/radio link (e.g. eNB 215), according to previous experiences (e.g. recent RL channel quality conditions) and latest channel quality of the radio links. Based on the traffic split ratio, the primary RLC entity 265 allocates a range of RLC SNs (out of the SN space) to the split packets (e.g. PDCP PDUs) and forwards the PDCP PDUs to the corresponding secondary RLC entities 270 for further ARQ processing. It should be noted that the primary RLC entity can determine the data split ratio among multiple RLs, in case of the multiple RL/connectivity scenario.

Upon receiving the PDCP PDUs from the primary RLC entity 265, the secondary RLC entity records them into its local ARQ buffer and notifies the underlying radio link scheduler of incoming traffic for subsequent scheduling. In the case of multiple RLs, there are a plurality of primary RLC entities 265 and secondary RLC entities.

At UL, since the UL PDUs can be received from multiple radio links, the primary RLC entity 265, as the anchor point of multiple connectivity, needs to take the re-ordering responsibility. Accordingly, the secondary RLC entity 270 doesn't have to re-order the RLC PDUs. It just feedbacks the RLC ACK to the UE and directly forwards the UL RLC PDUs to the primary RLC entity 265 for re-ordering.

It should be noted that the terms PDUs and packets can be used interchangeably in this disclosure.

Figure 3:
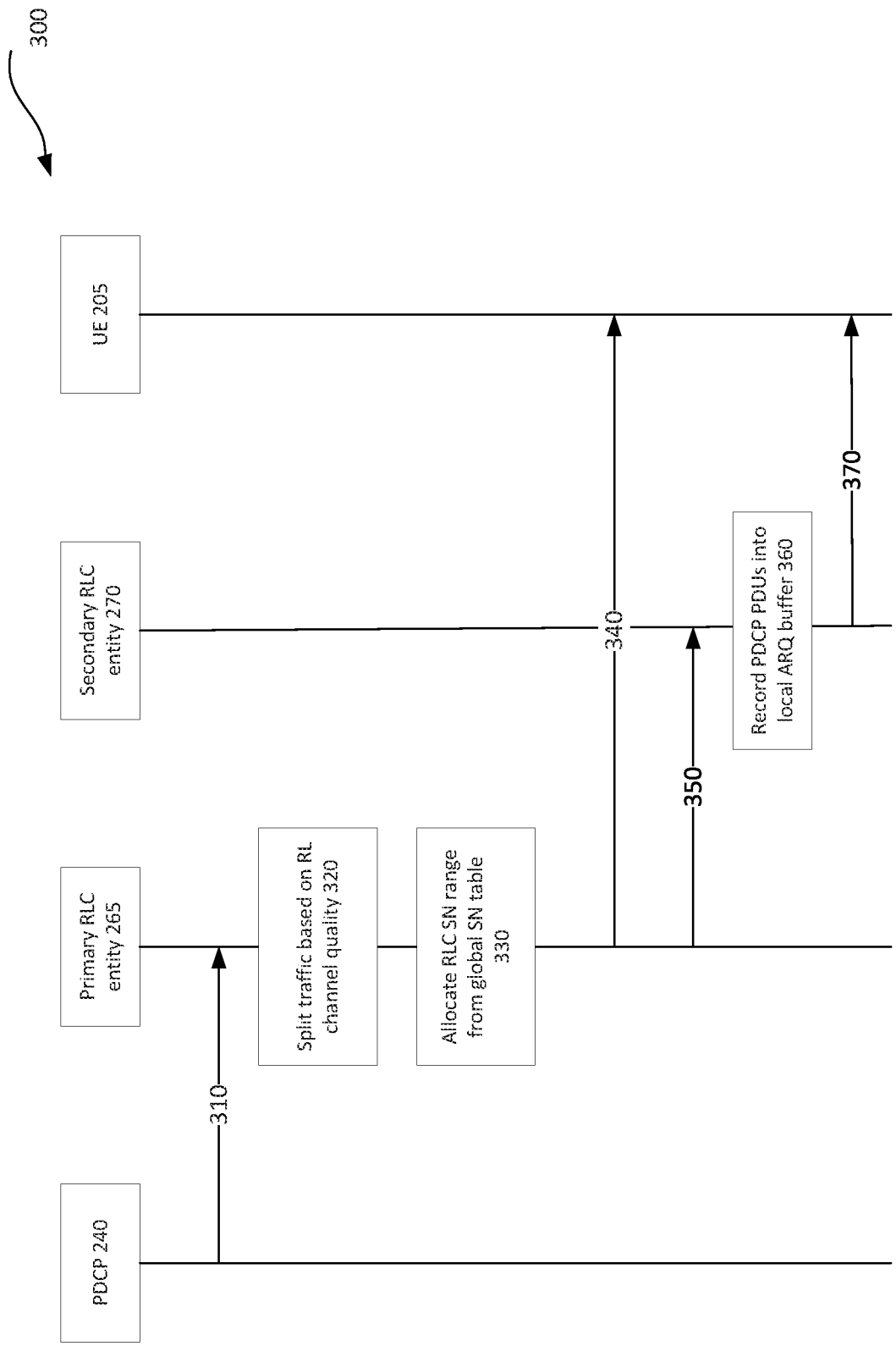
FIG. 3 illustrates a signaling diagram for handling packets in the downlink in the dual-connectivity structure of FIG. 2, in accordance with an embodiment.

For example, FIG. 3 illustrates a signaling diagram 300 for handling data packets in the downlink, in a multiple connectivity system. For example, a dual-connectivity system is illustrated.

In step 310, the PDCP layer 240 sends PDCP PDUs or packets to the primary RLC entity 265, using the F1-U interface, for example.

In step 320, upon receipt of the packets, the primary RLC entity 265 splits/separates the packets (or traffic) for transmission using the different paths/nodes of dual connectivity. The split of packets can be based on the RL channel quality, for example. The primary RLC entity 265 can obtain the channel quality through channel reports received from the secondary RLC entity 270, for example.

In step 330, the primary RLC entity 265 allocates RLC SN for the split packets for the first connectivity and the second connectivity. For example, the sequence numbers are allocated from a SN range taken from a global SN table/space, for each connectivity More specifically, a first range of SN can be allocated to a first group of packets (e.g. SN [1, 100]) and a second range of SN can be allocated to a second group of packets (e.g. SN [101-150]).

In step 340, the primary RLC entity 265 sends the first group of packets, having SN of [1, 100], to the UE 205.

In step 350, the primary RLC entity 265 sends the second group of packets, having SN of [100-150], to the secondary RLC entity 270, using the channel 260, for example.

In step 360, upon receipt of the packets, the secondary RLC entity 270 records the packets into its local ARQ buffer.

In step 370, the secondary RLC entity 270 sends the received packets to the UE.

Figure 4:
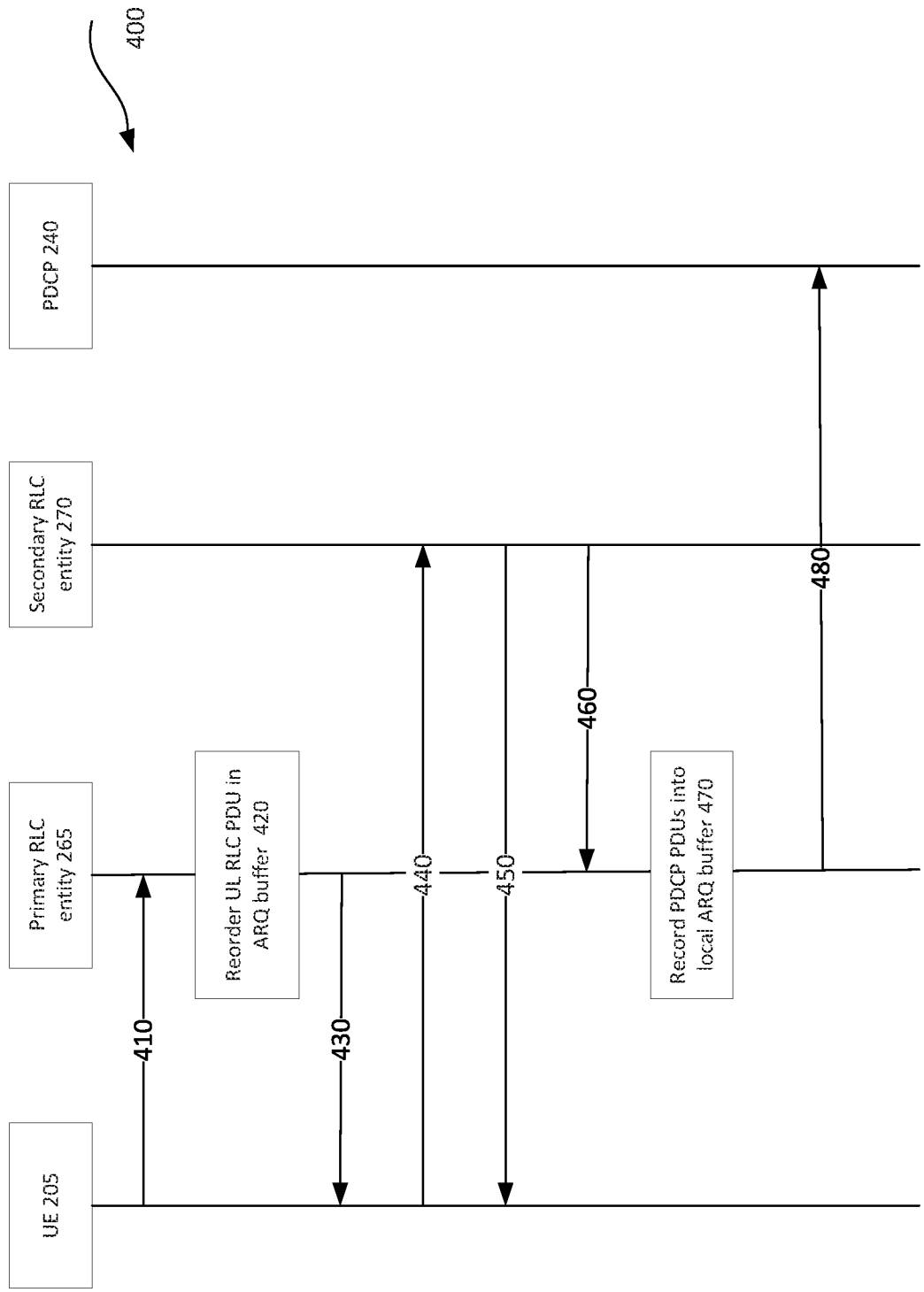
FIG. 4 illustrates a signaling diagram for handling packets in the uplink in the dual-connectivity structure of FIG. 2, in accordance with an embodiment.

FIG. 4 illustrates a signaling diagram 400 for handling data packets in the uplink, in a multiple connectivity system. For example, a dual-connectivity system is illustrated.

In step 410, the UE 205 sends packets to the primary RLC entity 265. The packets can be sent out of order. For example, packets with sequence numbers 1, 2, 5 and 8 are sent. Upon receipt of the packets, the primary RLC entity 265 records the packets into its local ARQ buffer.

In step 420, the primary RLC entity 265 re-orders the uplink RLC packets from the ARQ buffer.

In step 430, the primary RLC entity 265 sends a RLC acknowledgment (RLC ACK) for packets (1, 2, 5, 8) to the UE 205.

In step 440, the UE 205 sends some packets to the secondary RLC entity 270. For example, packets with sequence numbers 3, 4, 6 and 7 are sent.

In step 450, the secondary RLC entity 270 sends a feedback (RLC ACK) to the UE. Furthermore, in step 460, the secondary RLC entity 270 directly forwards the UL packets to the primary RLC entity 265 (using channel 260), without buffering.

In step 470, the primary RLC entity 265 re-orders all the received packets and concatenates them.

In step 480, the primary RLC entity 265 sends the ordered packets to the PDCP layer 240, using the F1-U interface, for example.

Channel 260 at the RLC Layer (or RLC Channel)

As mentioned earlier, the channel 260 allows to establish a connection between the primary entity and the secondary entities instead of setting up multiple F1-U connections between the PDCP layer in the cloud and multiple network nodes. Accordingly, the PDCP entity in the cloud needs only to set up a single F1-U connection with the primary RLC entity, without being aware of the other secondary RLC entities.

Since the channel 260 only exists within the logic RLC entities and is invisible to the external entities, it can be implemented as a proprietary interface between network nodes of the same vendor, for example, instead of being a public channel standardized by 3GPP. Moreover, compared with the public interface, the proprietary interface can have more flexibilities and optimization room for data semantics and message flow.

The channel 260 can be used for packet forwarding and RLC context transfer (e.g. RLC SN space, acknowledged SN, unacknowledged SN, configuration parameters, etc.) between the primary and secondary RLC entities, for example. For instance, packets such as PDCP PDUs and RLC SDU can be forwarded. But RLC PDUs (i.e. segments of PDCP PDUs) may need to be transmitted between the RLC entities as well, under the following scenarios:

Radio Link Unavailable:

Once the PDCP PDUs are forwarded to a secondary RLC entity, the secondary entity will record the packets into its local buffer (step 360) and try to guarantee a reliable transmission to the UE through the ARQ mechanism. However, if the radio link becomes unavailable, the reliable transmission can't be fulfilled even with the ARQ mechanism. Then, the unacknowledged (unACKed) RLC PDUs need to be forwarded from the secondary RLC entity back to the primary RLC for subsequent RLC retransmission by the primary or secondary RLC entity.

Handover:

Similar to the above scenario (i.e. unavailable radio link), during a handover, the source radio link becomes unavailable so that the unACKed RLC PDUs in the source node need to be forwarded to the target node.

Furthermore, the channel 260 can be used to reroute RLC control PDUs (e.g. status update) and measurement report.

Figure 5:
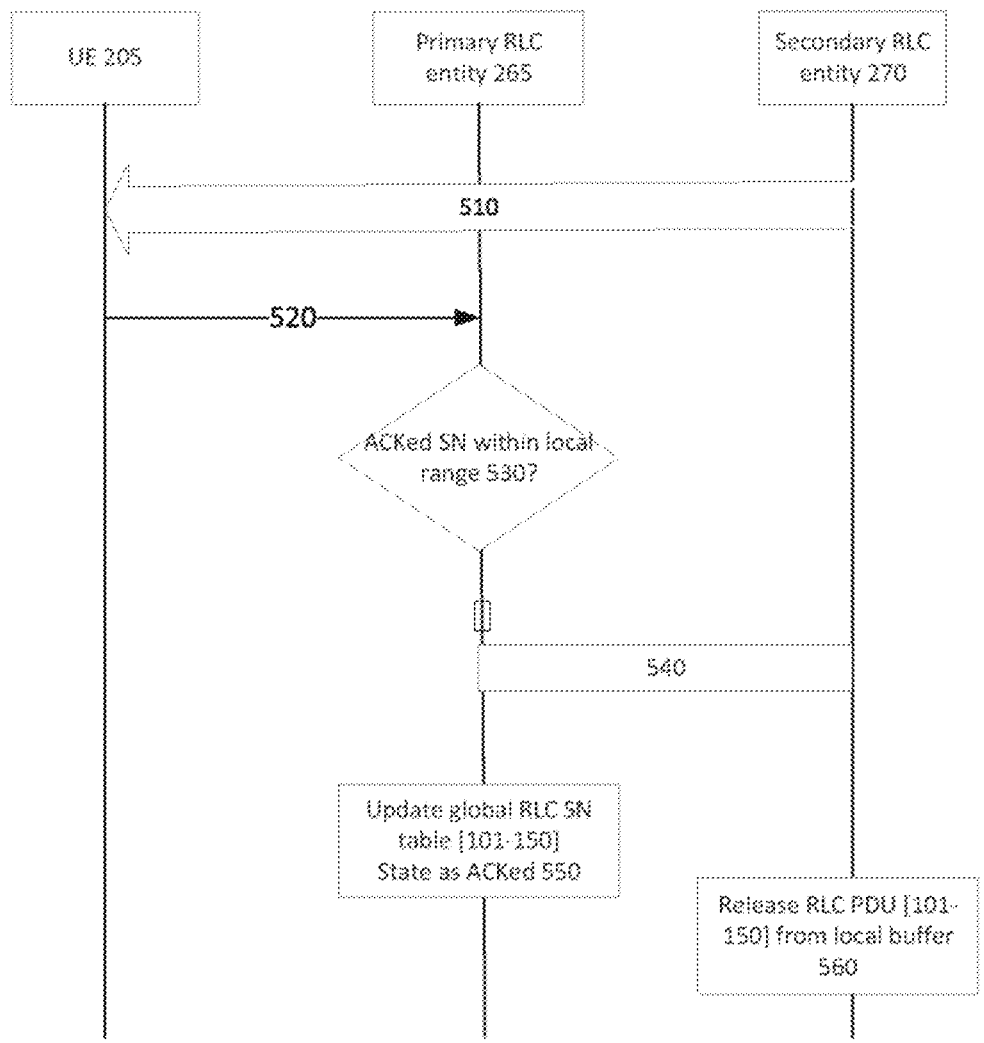
FIG. 5 illustrates a signaling diagram for handling control data in the uplink in the dual-connectivity structure of FIG. 2, in accordance with an embodiment.

Turning now to FIG. 5, a signal diagram 500 for processing Uplink Control packets is provided. It is assumed that the primary RLC entity has a local range of sequence numbers [1-100] and the secondary RLC entity 270 has a SN range of [101-150].

In step 510, the secondary RLC entity 270 sends ordered packets, e.g. packets [101-150], to the UE 205.

In step 520, the UE 205 acknowledges the received packets by sending a RLC ACK for packets [101-150] to the primary RLC entity 265.

In step 530, the primary RLC entity 265 checks if the acknowledged packets have their sequence numbers within a local range (the range allocated to the primary RLC entity). The sequence numbers [101-150] are not within the local range of [1-100]. Therefore, in step 540, the primary RLC entity 265 sends the RCL ACK for packets [101-150] to the secondary RLC entity 270.

In step 545, the secondary RLC entity 270 releases RLC PDUs packets [101-150] from the local buffer (of the secondary RLC entity).

Then in step 560, the primary RLC entity updates the global RLC SN table [101-150] state as acknowledged.

Figure 6:
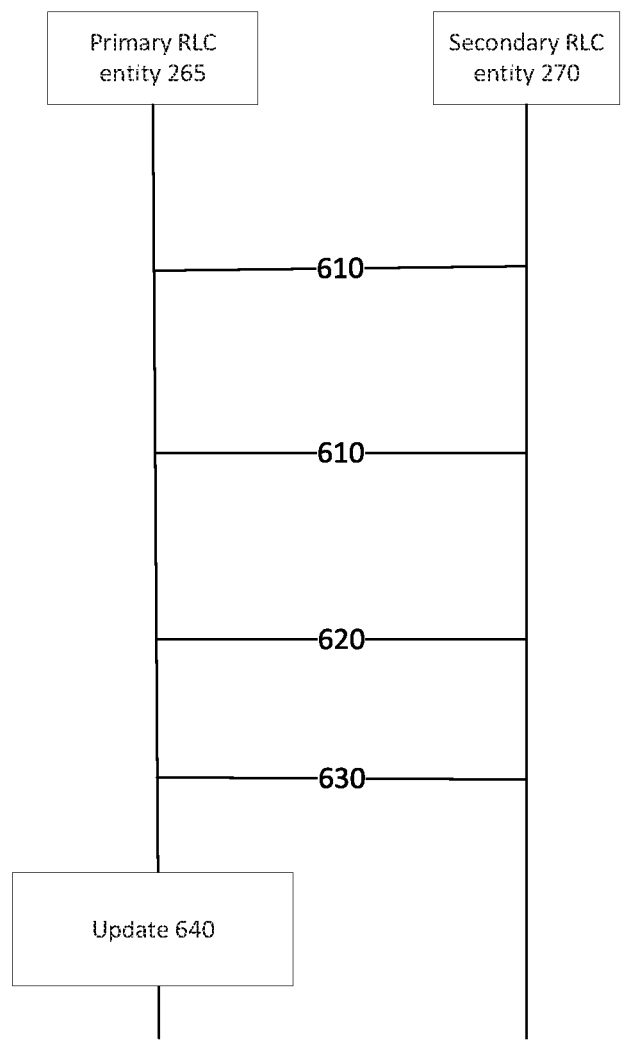
FIG. 6 is a signal diagram of transmitting channel quality reports, in accordance with some embodiments.

In FIG. 6, a signaling diagram 600 for radio link channel quality report is provided.

There are 2 kinds of reporting: periodic unsolicited report and aperiodic solicited report.

If a periodic unsolicited report is configured, in step 610, the secondary RLC entity sends a report to the primary node at every period of time, the report comprising the air channel quality.

If an aperiodic solicited report is configured, in step 620, the primary RLC entity sends a message to the secondary RLC entity requesting a channel quality report.

In step 630, in response to the request, the secondary RLC entity sends a report on the air channel quality to the primary RLC entity. The air channel quality can be determined based on measurements of the air channel/link channel, for example.

In step 640, upon receipt of the report, the primary RLC entity updates the secondary RLC entity's link channel quality. Based on the report, the primary RLC entity can predict radio link throughput for determining traffic split ratio.

Figure 7:
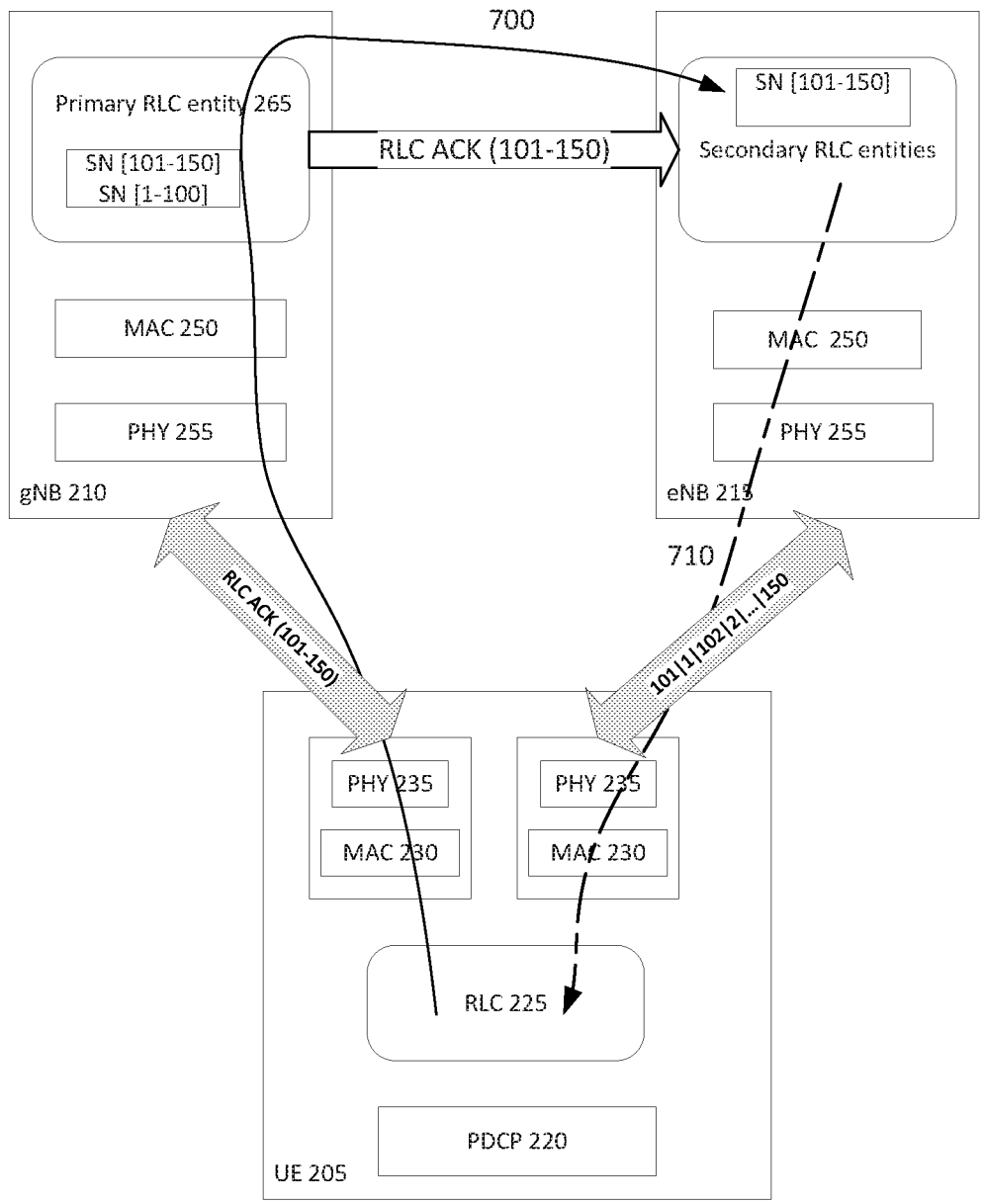
FIG. 7 is a schematic diagram for re-routing RLC status updates, in the dual-connectivity structure, in accordance with some embodiments.

Furthermore, since only a single logic RLC entity (instead of multiple distributed RLC entities) is used to interface external entities, the RLC behavior is decoupled from the underlying radio links, which means that the RLC ACK corresponding to specific RLC PDUs managed by one RLC entity can be received by another RLC entity as shown in FIG. 7.

For example, let's assume that the RLC SN range [101-150] is allocated to a secondary RLC entity. After the UE receives the RLC PDUs within that range from the secondary entity (path represented by dashed arrow 710), the UE needs to feedback the RLC ACK to the network node. The feedback can go through any of the available radio links to the network node. For example, it's possible for the primary RLC entity to receive the RLC ACK for packets having SN [101-150], which then can be forwarded to the secondary RLC entity through the channel 260; this path is represented by the arrow 700. Indeed, the gNB, when receiving the RLC sequence numbers, can look up a RLC SN allocation table to determine that the ACKnowledged (ACKed) RLC SN range [101-150] has been allocated to the secondary RLC entity. As such, the gNB knows that the RLC status update should be forwarded to the secondary RLC entity for ARQ processing.

Besides the RLC status update, the channel quality report also needs to be provided to the primary RLC entity. The RLC status update can be used as an estimation criterion for the traffic split ratio for example.

The RLC channel 260 can further have the following benefits if implemented as a proprietary interface:

1) Distributed Interface and Centralized Interface:

Considering multiple radio links connected to the same UE, the multiple nodes (e.g. gNBs, eNBs, WiMAx nodes, etc.) should be located in an adjacent area, i.e. the distance between the neighboring nodes should be small enough so that the delay in the RLC channel 260 should be shorter than that of the F1 interface, which connects the remote multiple nodes (e.g. gNBs, eNBs) with a centralized PDCP pool in the cloud. Moreover, unlike the existing F1 where all independent channel quality reports from thousands of nodes have to be delivered to the centralized PDCP pool for processing, the RLC channels are however distributed among different nodes so that the channel report load is also distributed accordingly.

2) Proprietary Interface and Public Interface:

The syntax and semantics of a channel quality report are closely related to the channel estimation algorithm, which means that the vendors may have their own channel quality syntax and semantics. As such, when using a proprietary channel 260 between neighboring nodes, the vendors can adopt vendor-specific syntax and semantics for an optimized channel quality estimation algorithm.

3) Add or Remove a Secondary RLC Entity:

Like in carrier aggregation, the secondary RLC entity can be dynamically added or removed along with the addition or removal of the underlying radio link.

Whenever a new radio link at a neighbor node is added, the corresponding RLC entity is also created at the neighbor node and registered with the primary RLC entity with the latest channel quality report. Furthermore, a RLC channel 260 is established between the primary RLC entity and the created RLC entity (i.e. secondary RLC entity), if it didn't exist before. Subsequently, the primary RLC entity can split the traffic between the secondary RLC entity and the primary RLC entity, so that the UE throughput is increased (through the use of the additional radio link).

However, when the radio link becomes poor enough (e.g. below a threshold), it needs to be removed from the current UE's radio link set. As such, the secondary RLC entity also needs to be deregistered from the primary RLC entity. During this process, a special action needs to be taken for forwarding unACKed RLC PDUs from the secondary RLC entity back to the primary RLC entity to guarantee the subsequent RLC PDU retransmission.

Figure 8:
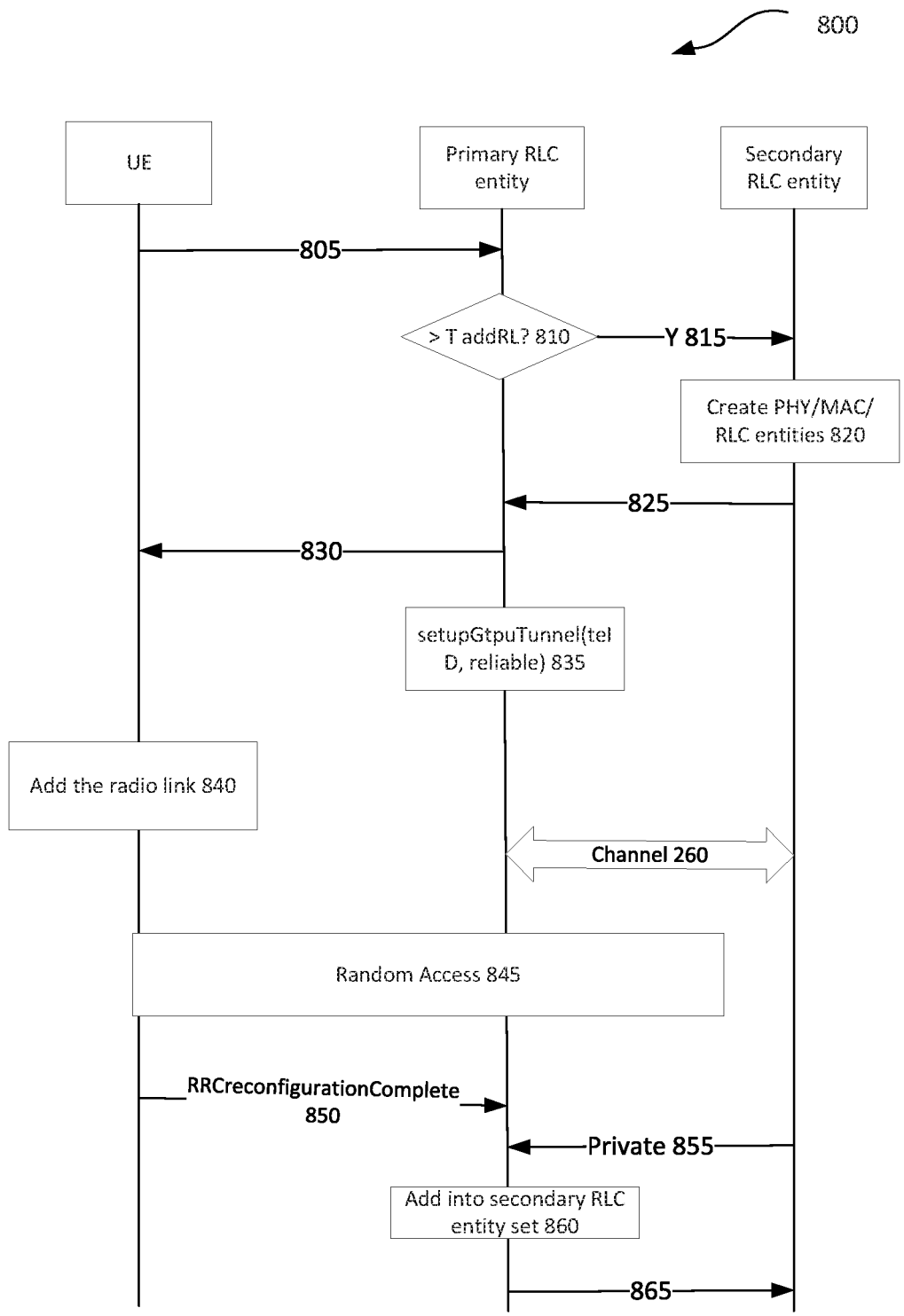
FIG. 8 is a signal diagram for adding a secondary RLC entity, in accordance with some embodiments.

FIG. 8 illustrates a signaling diagram 800 for adding a RLC entity.

In step 805, the UE sends a message to the primary RLC entity, for requesting a measurement report (MR). The message comprises a candidate list of neighboring network nodes (e.g. eNB/gNB) identifiers (IDs) whose signal strengths exceed the threshold "T_add" for adding a radio link. After receiving the MR, the UE selects an appropriate neighbor network node from the candidate list, based on the MR. Then, the UE notifies the primary RLC entity about adding a RL for the selected network node, through the F1-C interface.

In step 810, the primary RLC entity determines if the primary RLC entity has capacity for adding radio links. If yes, in step 815, the primary RLC entity can start the procedure for adding radio links. To do so, the RLC entity sends a request to the secondary RLC entity to add a radio link, using the X2 interface. The request comprises a cell identifier (cellID), indicating the cell on which the secondary RLC entity is located. The cellID will be also used during the setup of the channel between the primary and secondary RLC entities.

In step 820, upon receipt of the request, the secondary RLC entity creates a PHY entity, a MAC entity and a RLC entity in the cell corresponding to cellID.

In step 825, the secondary RLC entity sends a response message to the primary RLC entity to inform the primary RLC entity that the radio link has been added. The response message may comprise teID, which refers to a tunnel ID, which is the identifier of the GTP-U tunnel. For example, the RLC channel 260 may be given by a pair of teIDs.

In step 830, the primary RLC entity sends a configuration message to the UE. The message is a RRCreconfiguration message, for example. The message may have as parameters: adding a radio link command (addRL) and a frequency (to be used for the added radio link). For example, the addRL is a RRC information element (IE) to indicate UE to add a RL with a specific cell.

In step 835, after receipt of the reconfiguration message, the UE adds the radio link.

In step 840, the primary RLC entity set up a tunnel, that is reliable, for teID, and establishes the channel 260 between the primary RLC entity and secondary RLC entity.

In step 845, the UE performs the Random Access procedure with the secondary RLC entity.

In step 850, the UE sends a message to the primary RLC entity to confirm that the UE is connected to the primary RLC entity.

In step 855, the secondary RLC entity sends a request to register a RLC entity to the primary RLC entity. The request comprises a radio bearer list and channel quality.

In step 860, upon the receipt of the request, the primary RLC entity adds the secondary RLC entity to the RLC entity set.

In step 860, after adding the secondary RLC entity to its list, the primary RLC entity sends a response to the secondary RLC entity to confirm/acknowledge the addition.

Figure 9:
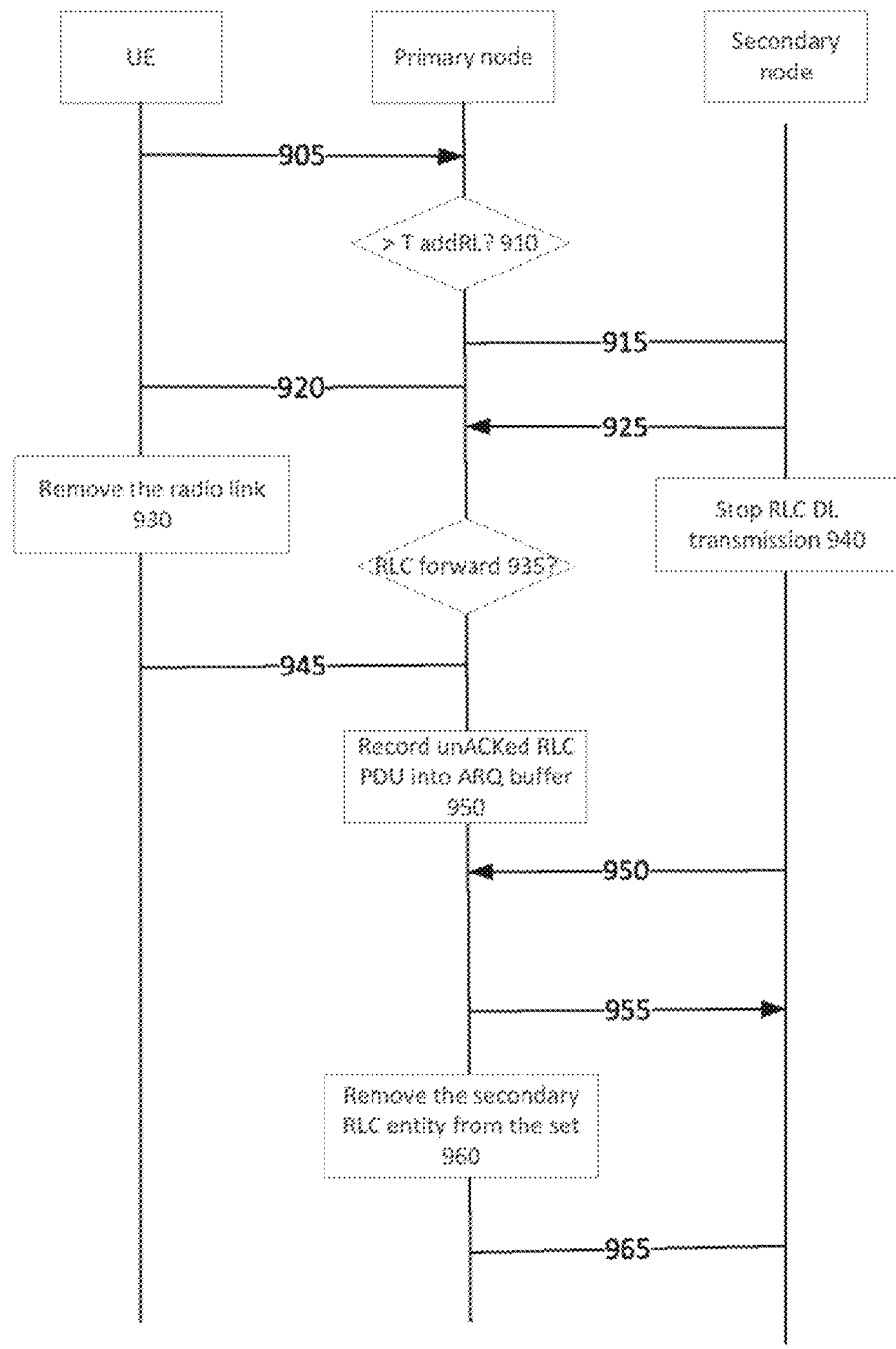
FIG. 9 is a signal diagram for removing a secondary RLC entity, in accordance with some embodiments.

FIG. 9 illustrates a signaling diagram for releasing/deleting a RLC entity.

In step 905, the UE sends a message to the primary RLC entity, for requesting a measurement report. The message comprises a candidate list of network nodes.

In step 910, the primary RLC entity determines if the primary RLC entity's capacity is inferior to a threshold capacity for having/connecting radio links. If yes, in step 915, the primary RLC entity sends a request to the secondary RLC entity to delete a radio link, using the X2 interface. The request comprises a cell identifier (cellID).

In step 915, the primary RLC entity sends a reconfiguration message to the UE, the message comprising a delete radio link (delRL) command.

In step 920, the secondary RLC entity sends a response to the primary RLC entity for acknowledging the deletion of the radio link.

In step 925, the secondary RLC entity stops transmitting RLC packets in the downlink.

In step 930, upon receipt of the reconfiguration message, the UE deletes/removes the radio link.

In step 935, the primary RLC entity determines if it should continue to forward RLC packets to the secondary RLC entity. If yes, the primary RLC entity forwards unACKed packets to the secondary RLC entity.

In step 940, the primary RLC entity records unACKed RLC packets into its ARQ buffer.

In step 945, the secondary RLC entity sends a message to the primary RLC entity, the message indicating to deregister the secondary RLC entity with the primary RLC entity. The message is associated with a radio bearer list.

In step 935, if the primary RLC entity determines that it should not continue to forward RLC packets to the secondary RLC entity, the primary RLC entity removes the secondary RLC entity from the set. And in step 950, the primary RLC entity sends a message to the secondary RLC entity to indicate de-registration of the secondary RLC entity.

Primary RLC Role Transfer

When the radio link related to the original primary RLC entity becomes unavailable for different reasons (e.g. primary RLC entity's memory is insufficient), the primary RLC entity's role needs to be transferred to one of the secondary RLC entities, which includes the following two steps:

1) RLC Context Transfer

Besides the RLC resource control, the primary RLC entity also manages all the registered secondary RLC entities as well as the global RLC SN space allocation. These functions need to be transferred to the secondary RLC entity selected as the new primary RLC entity, to guarantee uninterrupted RLC service.

2) External Interface Transfer

After receiving the RLC context from the original primary RLC entity, the selected secondary RLC entity takes the primary RLC role and notifies the PDCP entity of its primary role by establishing a new F1-U interface with the PDCP entity in the cloud. The PDCP entity in the cloud then deletes the old F1-U interface and switches the traffic to the newly established F1-U interface.

The selection of one of the secondary RLC entities to be the new primary RLC entity may depend on the primary RLC implementation. For example, the following factors can be considered (channel quality, which node (e.g. eNB or gNB) should have the primary RLC entity, if the secondary RCL entity allows for to have the primary entity role or not, etc.).

Composite Transport Protocol Stack

The existing F1-U interface adopts GTP-U|UDP|IP as its underlying transport stack, which can't support reliable transmissions. That's the reason why the existing 3GPP TS. 38.425 (F1 interface) specifies that RRC signaling is carried on the F1-C interface instead of F1-U.

However, with the introduction of the RLC channel 260 and a single PDCP deployment, the underlying transport protocol stack of F1-U is improved to support unreliable and reliable transmissions simultaneously.

Indeed, under the GTP-U layer, which provides individual tunnel for each radio bearer, two types of transport protocols (UDP for unreliable transmission and Stream Control Transmission Protocol (SCTP) for reliable transmission) are supported. Whenever a radio bearer is set up, it needs to inform the GTP-U about a new parameter indicating what kind of underlying transport service is needed, e.g. unreliable or reliable, based on which a transport protocol is chosen. For example, for a Signalling Radio Bearer (SRB), which transmits RRC signaling, it relies on reliable transmission so that the SCTP protocol is bundled with the SRB GTP-U tunnel. For Data Radio Bearer (DRB), which transmits VoIP packets, the unreliable transmission is good enough so that the UDP protocol is bundled with the DRB GTP-U tunnel.

Since the high-level application only accesses the GTP-U tunnel instead of caring about the underlying transport protocol, such a composite transport stack can provide the same access point as the existing GTP-U, i.e. the improvement is invisible to the above applications, which can guarantee backward compatibility.

Like the F1-U interface, the RLC channel 260 can also adopt the composite stack as its underlying transport protocol. However, the RLC channel 260 only needs reliable transmissions, therefore, SCTP can be chosen for all RLC tunnels 260.

Figure 10:
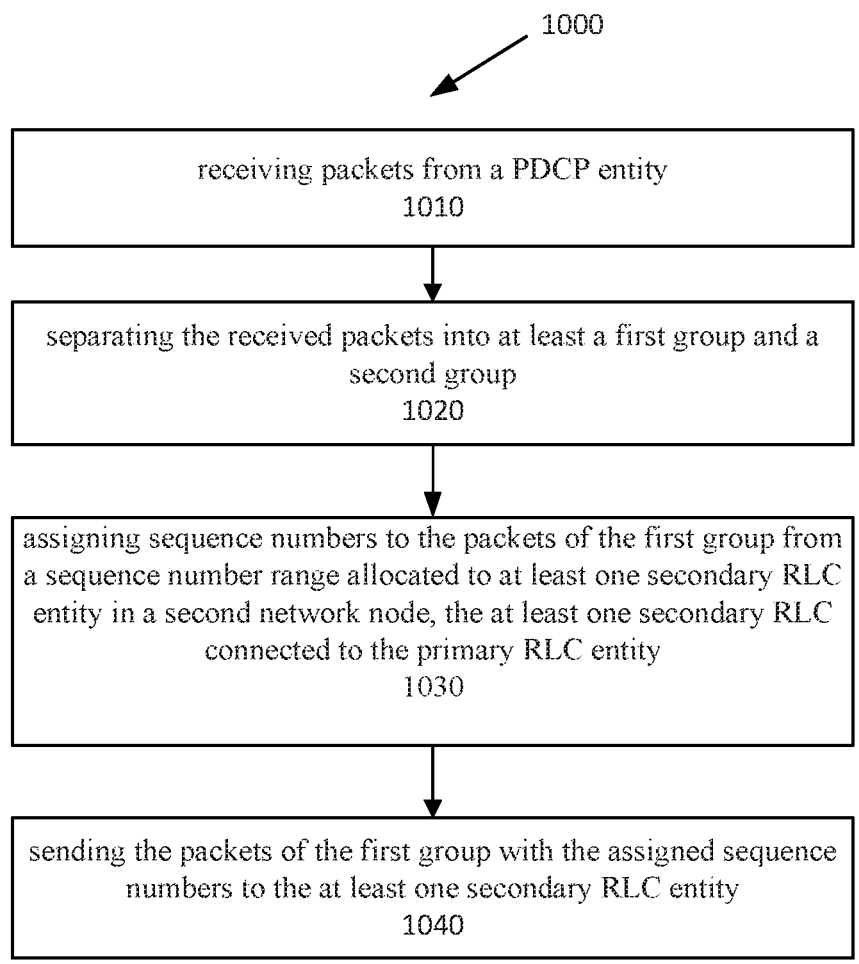
FIG. 10 illustrates a flow diagram of a method in a first node which comprises a primary RLC entity, in accordance with some embodiments.

Turning now to FIG. 10, a flow chart of a method 1000 in a first network node will be described. The first network node can be the gNB 210, for example. The first network node may comprise a primary RLC entity. The method can be implemented in the primary RLC entity (or first network node). The method comprises:

Step 1010: receiving packets from a PDCP entity;

Step 1020: separating the received packets into at least a first group and a second group;

Step 1030: assigning sequence numbers to the packets of the first group from a sequence number range allocated to at least one secondary RLC entity in a second network node, the at least one secondary RLC connected to the primary RLC entity RLC entity through a Radio Link Control (RLC) channel;

Step 1040: sending the packets of the first group with the assigned sequence numbers to the at least one secondary RLC entity.

In some embodiments, the primary RLC entity can assign sequence numbers to the packets of the second group from a sequence number range used by the primary RLC entity.

In some embodiments, the primary RLC entity can send the packets of the second group with the assigned sequence numbers to a wireless device.

In some embodiments, the primary RLC entity can determine a split ratio for separating the received packets. For example, the split ratio is based on channel quality reports, received from the at least secondary RLC entity.

In some embodiments, the primary RLC entity can add another secondary RLC entity to the primary RLC entity.

In some embodiments, the addition of the other secondary RLC entity is based on a measurement report received from the wireless device. For example, the measurement report may be used to determine that a new radio link from which the other secondary RLC entity is based needs to be added.

In some embodiments, the primary RLC entity may send a reconfiguration message to the wireless device for configuring the radio link from which the other secondary RLC entity is based.

In some embodiments, the primary RLC entity may establish a RLC channel between the primary RLC entity and the other secondary RLC entity.

In some embodiments, the primary RLC entity may remove the at least one secondary RLC entity.

In some embodiments, the primary RLC entity may receive RLC acknowledgements for packet reception from the wireless device.

In some embodiments, the primary RLC entity may determine that the sequence numbers of the acknowledged packets belong to the sequence number range allocated to the secondary RLC entity. In response to that determining, the primary RLC entity can send the acknowledgements corresponding to the packets, having the sequence numbers in the sequence number range allocated to the secondary RLC entity, to the secondary RLC entity.

In some embodiments, the PDCP entity is connected only to the primary RLC entity through a F1-U interface.

Figure 11:
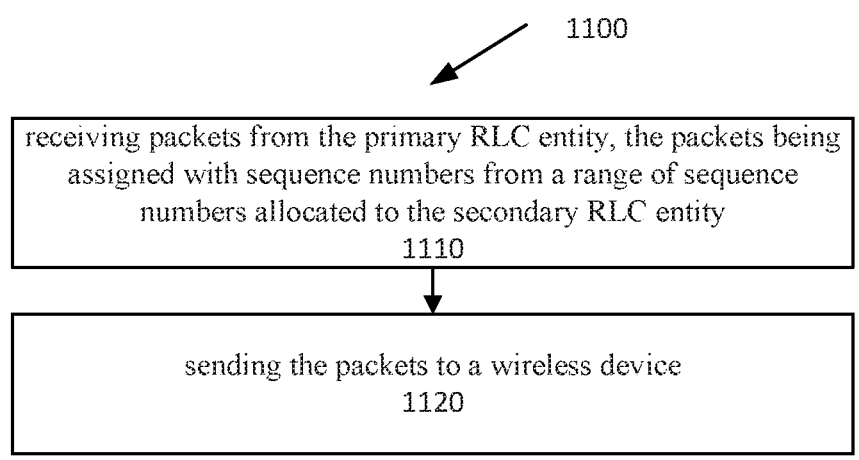
FIG. 11 illustrates a flow diagram of a method in a second node, which comprises a secondary RLC entity, in accordance with some embodiments.

FIG. 11 illustrates a flow diagram of a method 1100 in a second network node. The second network node may comprise a secondary RLC entity. The second network node could be a gNB or eNB. The method can be implemented in the secondary RLC entity for example. The method comprises:

Step 1110: receiving packets from a primary RLC entity in a first network node, the packets being assigned with sequence numbers from a range of sequence numbers allocated to the secondary RLC entity, wherein the primary RLC entity is connected to the secondary RLC entity through a Radio Link Control (RLC) channel;

Step 1120: sending the packets to a wireless device.

In some embodiments, the secondary RLC entity can receive acknowledgements for the packets from the primary RLC entity.

In some embodiments, the secondary RLC entity can record the received packets into a buffer.

In some embodiments, the secondary RLC entity can release the packets from the buffer upon receiving acknowledgements directly from the wireless device or rerouted by the primary RLC entity.

In some embodiments, the secondary RLC entity can send a channel quality report to the primary RLC entity. For example, the sending of the channel report is based on one of a periodic time interval and an aperiodic request from the primary RLC entity.

Figure 12:
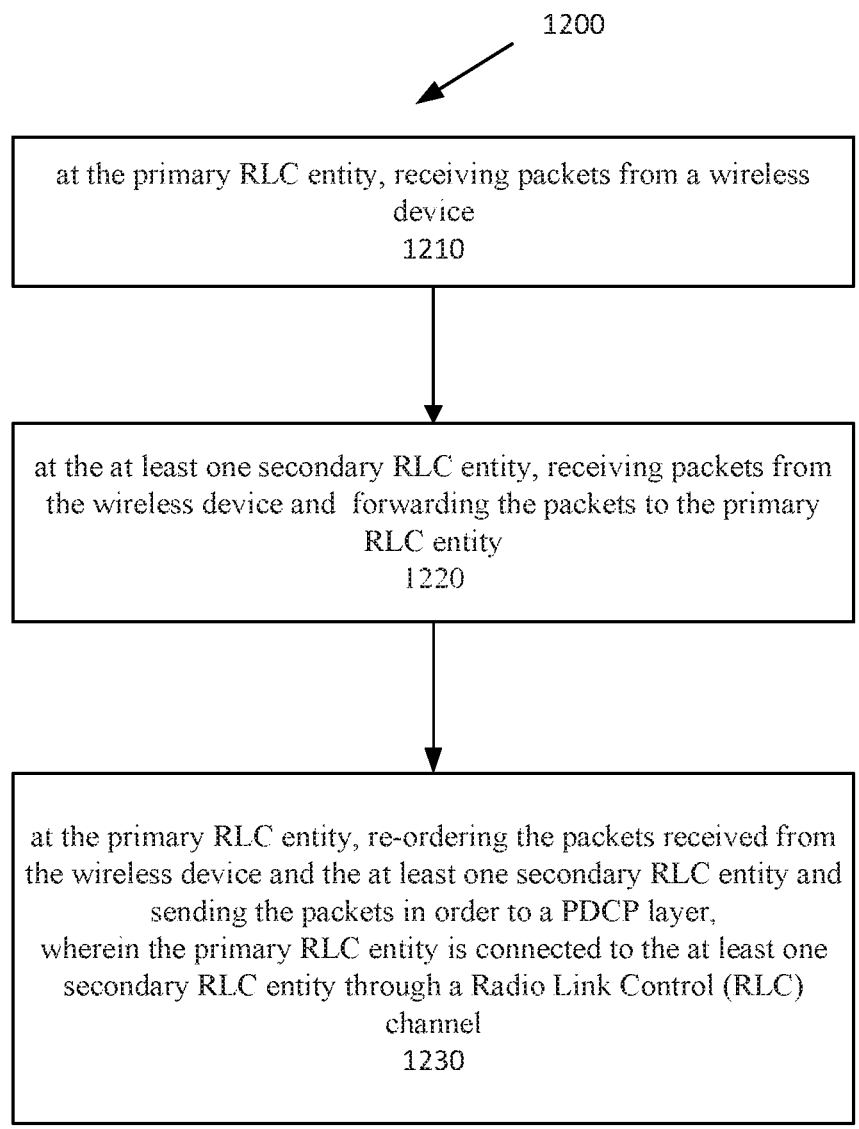
FIG. 12 illustrates a method in a communication system, in accordance with some embodiments.

FIG. 12 illustrates a method 1200 in a communication system including at least a first network node and a second network node, the first network node comprising a primary RLC entity and the second network node comprising at least one secondary RLC entity. The method 1200 comprises:

Step 1210: at the primary RLC entity, receiving packets from a wireless device;

Step 1220: at the at least one secondary RLC entity, receiving packets from the wireless device and forwarding the packets to the primary RLC entity;

Step 1230: at the primary RLC entity, re-ordering the packets received from the wireless device and the at least one secondary RLC entity and sending the packets in order to a PDCP layer, wherein the primary RLC entity is connected to the at least one secondary RLC entity through a Radio Link Control (RLC) channel.

In some embodiments, the primary RLC entity can send the packets to the PDCP layer using a reliable transmission if the packets are for RRC signaling. For example, the reliable transmission is given by STCP or any other protocols providing reliable transmissions.

In some embodiments, the primary RLC entity can send the packets to the PDCP layer using an unreliable transmission if the packets are user data. For example, the unreliable transmission is given by UDP or any other protocols providing unreliable transmissions.

In some embodiments, both the reliable and unreliable transmission protocols are encapsulated with a uniform service access protocol, which selects underlying transmission protocols according to a configured parameter during radio bearer setup.

In some embodiments, a wireless device needs only one RLC entity, configured to receive packets from one primary RLC entity and at least one secondary RLC entity in one or more network nodes or to send packets to the primary RLC entity and the at least one secondary RLC entity.

Figure 13:
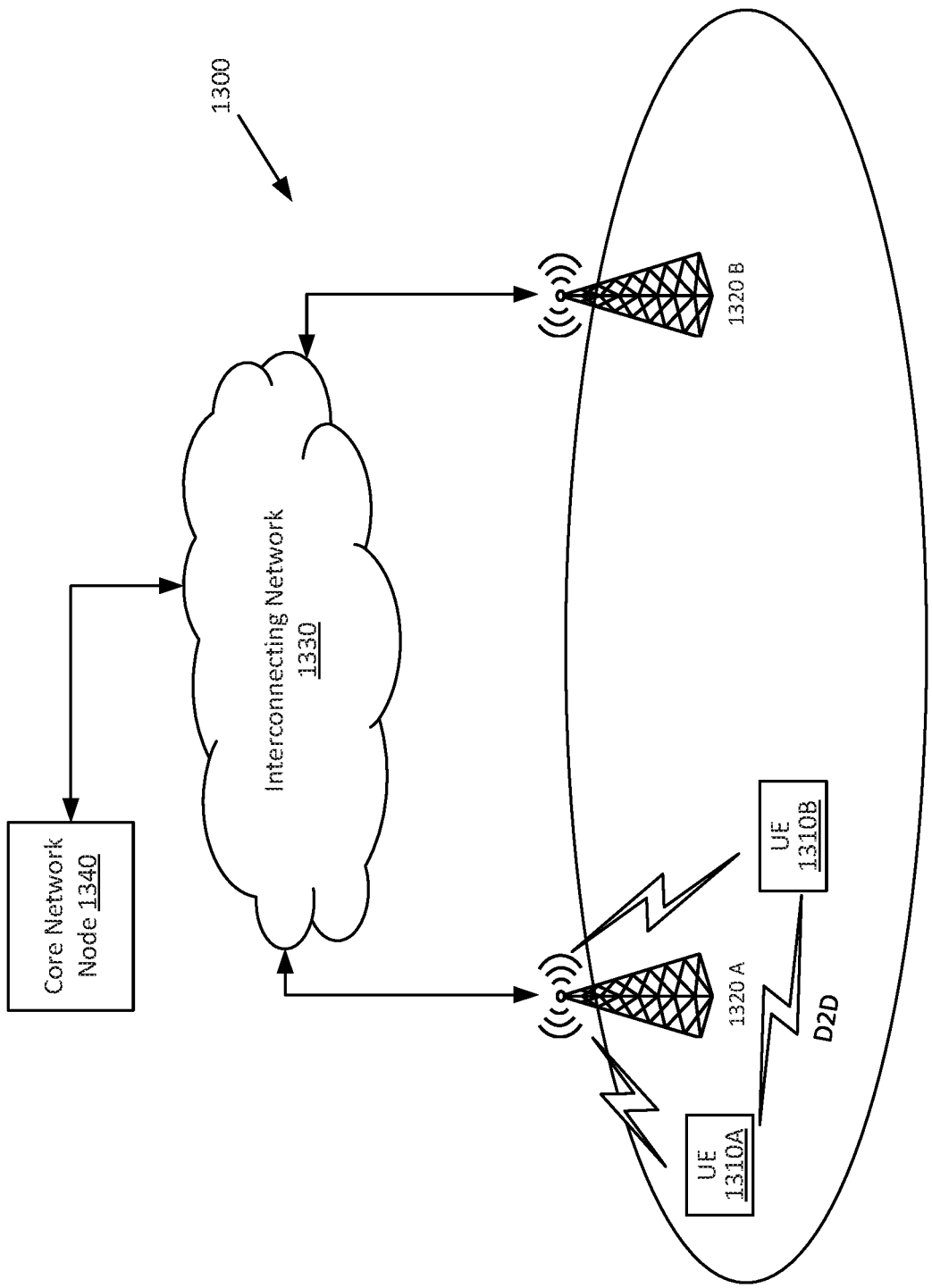
FIG. 13 illustrates one example of a wireless communications system in which embodiments of the present disclosure may be implemented.

The present disclosure contemplates that the various embodiments described herein may be applied to a variety of networks such as the one shown in FIG. 13.

FIG. 13 illustrates an example of a wireless network 1300 that may be used for wireless communications. Wireless network 1300 includes UEs 1310A-1310B (collectively referred to as UE or UEs 1310) and a plurality of radio network nodes 1320A-1320B (e.g., Node Bs (NBs) Radio Network Controllers (RNCs), evolved NBs (eNBs), next generation NB (gNBs), etc.) (collectively referred to as network nodes 1320) directly or indirectly connected to a core network 1330 which may comprise various core network nodes. For example, the UE 1310 are the same as the UE 205, and the gNB 1320 are the same as the gNB 210 (or eNB 215), as illustrated in FIG. 2. The network 1300 may use any suitable radio access network (RAN) deployment scenarios, including Universal Mobile Telecommunication System (UMTS) Terrestrial Radio Access Network (UTRAN), and Evolved UMTS Terrestrial Radio Access Network (EUTRAN). UEs 1310A and 1310B may each be capable of communicating directly with radio network nodes 1320 over a wireless interface. In certain embodiments, UEs may also be capable of communicating with each other via device-to-device (D2D) communication. In certain embodiments, network nodes 1320 may also be capable of communicating with each other, e.g. via an interface (e.g. X2 in LTE or other suitable interface).

As an example, UE 1310A may communicate with radio network node 1050 over a wireless interface. That is, UE 1310A may transmit wireless signals to and/or receive wireless signals from radio network node 1320. The wireless signals may contain voice traffic, data traffic, control signals, and/or any other suitable information.

It should be noted that a UE 1310 may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc. Example embodiments of a wireless device 1310 or 205 are described in more detail below with respect to FIGS. 14 and 15.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 1320 may interface with a radio network controller (not shown). The radio network controller may control network nodes 1320 and may provide certain radio resource management functions, mobility management functions, and/or other suitable functions. In certain embodiments, the functions of the radio network controller may be included in the network node 1320. The radio network controller may interface with the core network node 1340. In certain embodiments, the radio network controller may interface with the core network node 1340 via the interconnecting network 1330.

The interconnecting network 1330 may refer to any interconnecting system capable of transmitting audio, video, signals, data, messages, or any combination of the preceding. The interconnecting network 1330 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 1340 may manage the establishment of communication sessions and various other functionalities for wireless devices 1310. Examples of core network node 1340 may include MSC, MME, SGW, PGW, O&M, OSS, SON, positioning node (e.g. E-SMLC), MDT node, etc. Wireless devices 1310 may exchange certain signals with the core network node 1340 using the non-access stratum layer. In non-access stratum signaling, signals between wireless devices 1310 and the core network node 1340 may be transparently passed through the radio access network. In certain embodiments, network nodes 1320 may interface with one or more other network nodes over an internode interface. For example, network nodes 1320 may interface each other over an X2 interface.

Although FIG. 13 illustrates a particular arrangement of network 1300, the present disclosure contemplates that the various embodiments described herein may be applied to a variety of networks having any suitable configuration. For example, network 1300 may include any suitable number of wireless devices 1310 and network nodes 1320, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc.

Figure 14:
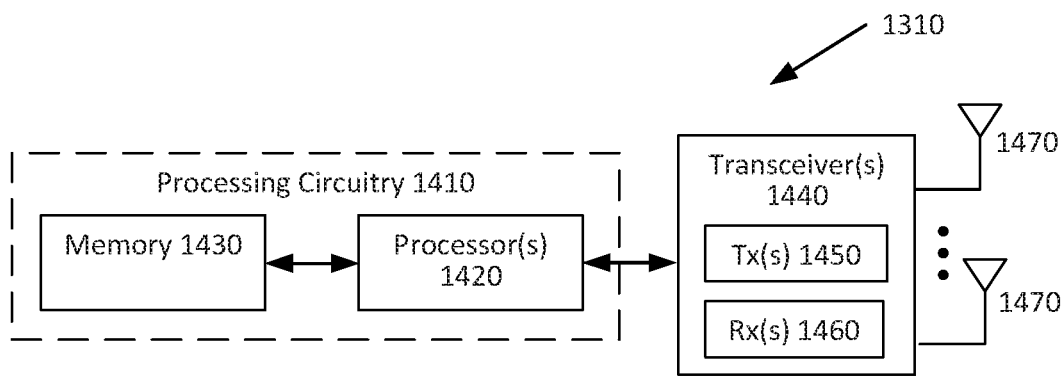
FIGS. 14 and 15 are block diagrams that illustrate a wireless device according to some embodiments of the present disclosure.

FIG. 14 is a schematic block diagram of the wireless device 1310 according to some embodiments of the present disclosure. As illustrated, the wireless device 1310 includes circuitry/circuit 1410 comprising one or more processors 1420 (e.g., Central Processing Units (CPUs), Application Specific Integrated Circuits (ASICs), Field Programmable Gate Arrays (FPGAs), and/or the like) and memory 1430. The wireless device 1310 also includes one or more transceivers 1440 each including one or more transmitter 1450 and one or more receivers 1460 coupled to one or more antennas 1470. In some embodiments, the functionality of the wireless device 1310 described above may be fully or partially implemented in software that is, e.g., stored in the memory 1430 and executed by the processor(s) 1420. For example, the processor 1420 is configured to perform any operations related to the UE in FIGS. 3, 4, 5, 8 and 9. For example, the wireless device 1310 may be configured with only one RLC entity for receiving and sending packets to the primary RLC and one or more secondary RLC entities, wherein the primary RLC entity is connected to the at least one secondary RLC entity through a RLC channel.

In some embodiments, a computer program including instructions which, when executed by the at least one processor 1420, causes the at least one processor 1420 to carry out the functionality of the wireless device 1310 according to any of the embodiments described herein is provided (e.g. any operations related to the UE in FIGS. 3, 4, 5, 8 and 9). In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 15:
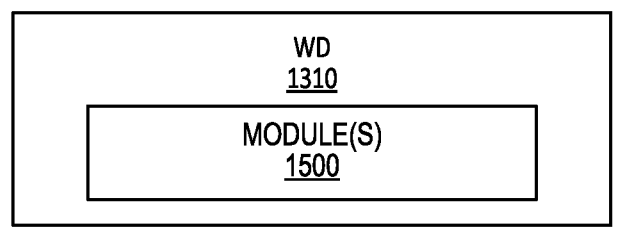

FIG. 15 is a schematic block diagram of the wireless device 1310 according to some other embodiments of the present disclosure. The wireless device 1310 includes one or more modules 1500, each of which is implemented in software. The module(s) 1500 provide the functionality of the wireless device 1310 described herein.

Figure 16:
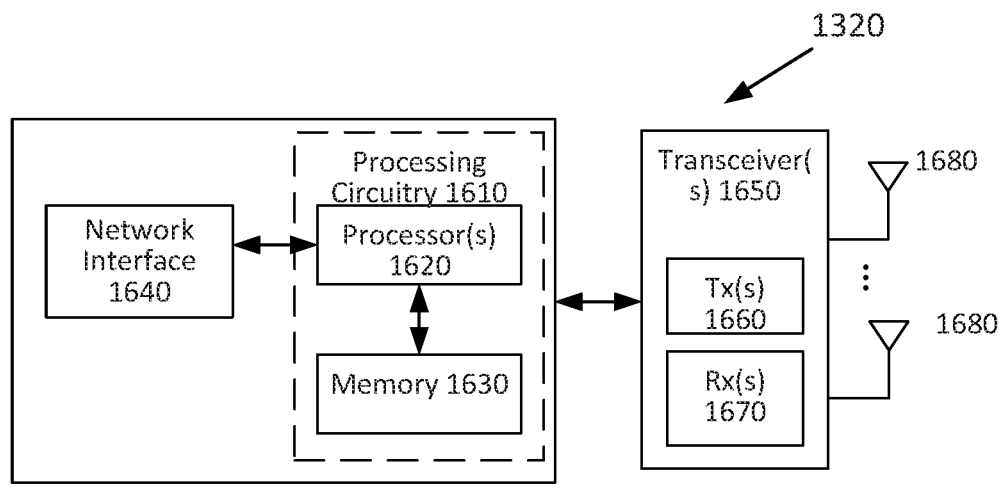
FIGS. 16 and 17 are block diagrams that illustrate a network node according to some embodiments of the present disclosure.

FIG. 16 is a schematic block diagram of a network node 1320 according to some embodiments of the present disclosure. As illustrated, the network node 1320 includes a processing circuitry/circuit 1610 comprising one or more processors 1620 (e.g., CPUs, ASICs, FPGAs, and/or the like) and memory 1630. The network node also comprises a network interface 1340. The network node 1320 also includes one or more transceivers 1650 that each include one or more transmitters 1660 and one or more receivers 1670 coupled to one or more antennas 1380. In some embodiments, the functionality of the network node 1320 described above may be fully or partially implemented in software that is, e.g., stored in the memory 1630 and executed by the processor(s) 1620. For example, the processor 1620 can be configured to perform method 1000 of FIG. 10 (when the network node is the first network node), method 1100 of FIG. 11 (when the network node is the second network node) and method 1200 of FIG. 12 (when the network node could be either the first or second network node).

Figure 17:
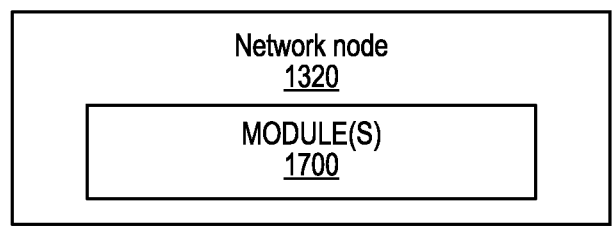

FIG. 17 is a schematic block diagram of the network node 1320 according to some other embodiments of the present disclosure. The network node 1320 includes one or more modules 1700, each of which is implemented in software. The module(s) 1700 provide the functionality of the network node 1320 described herein. The module(s) 1700 may comprise, for example, a receiving module operable to perform step 1010 of FIG. 10, a separating module operable to perform step 1020 of FIG. 10, an assigning module operable to perform step 1030 of FIG. 10 and a sending module operable to perform step 1040 of FIG. 10. The module(s) 1700 may comprise, for example, a receiving module operable to perform step 1110 of FIG. 11, and a sending module operable to perform step 1120 of FIG. 11.

Figure 18:
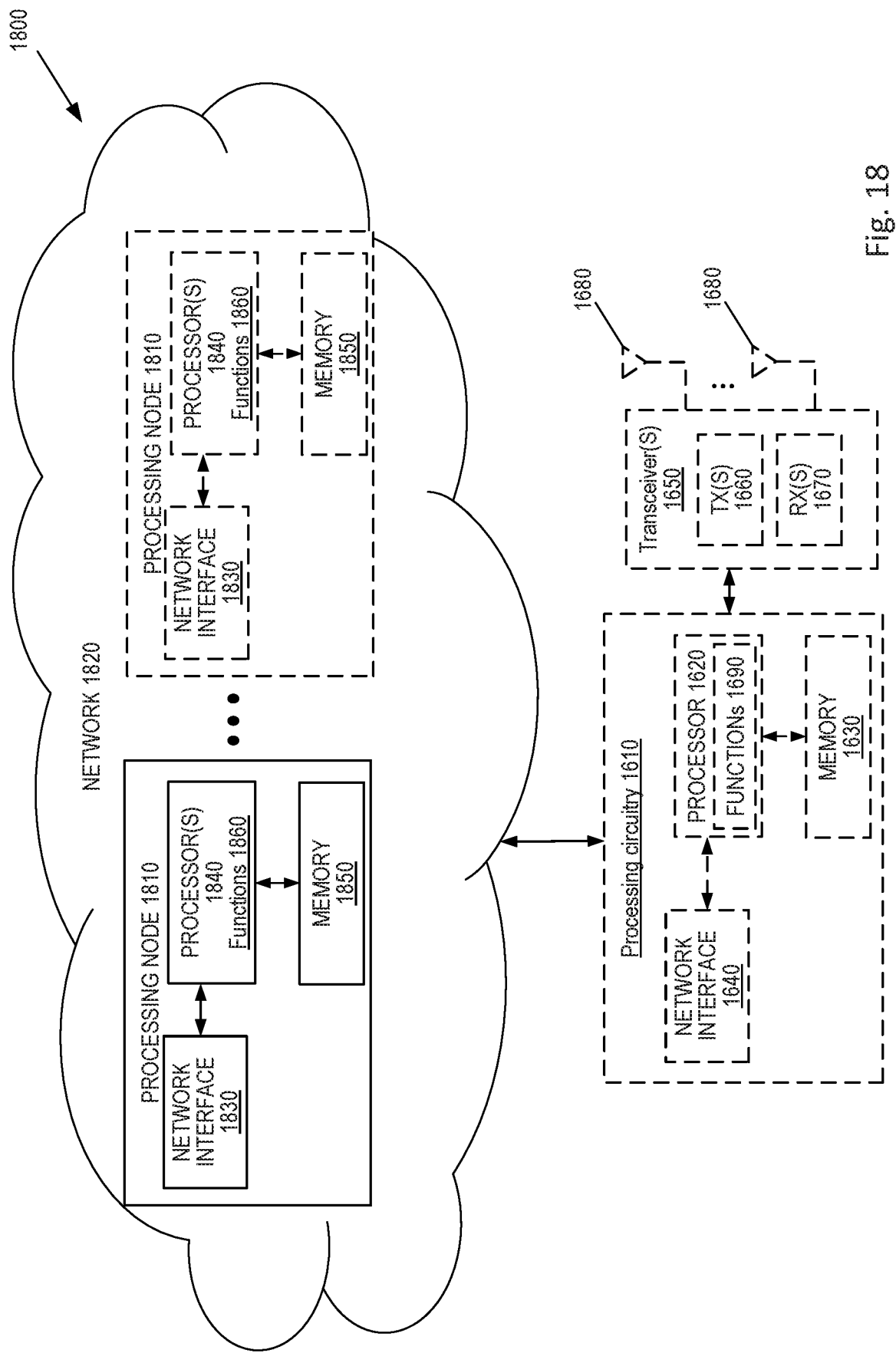
FIG. 18 illustrates a virtualized environment of a network node, according to some embodiments of the present disclosure.

FIG. 18 is a schematic block diagram 1800 that illustrates a virtualized embodiment of the network node 1320, according to some embodiments of the present disclosure. As used herein, a "virtualized" network node 1800 is a network node 1800 in which at least a portion of the functionality of the network node 1500 is implemented as a virtual component (e.g., via a virtual machine(s) executing on a physical processing node(s) in a network(s)). As illustrated, if the network node 180 is the radio access node 1320, the network node 1800 also includes the one or more transceivers 1350, as described with respect to FIG. 13. The network node 1800 includes one or more processing nodes 1810 coupled to or included as part of a network(s) 1820 via the network interface 1530. Alternatively, all of the functionality of the network node 1800 described herein may be implemented in the processing nodes 1810. Each processing node 1810 includes one or more processors 1540 (e.g., CPUs, ASICs, FPGAs, and/or the like), memory 1850, and a network interface 1830.

In this example, functions 1860 of the network node 1800 described herein are implemented at the one or more processing nodes 1840 in any desired manner. In some particular embodiments, some or all of the functions 1860 of the network node 1800 described herein are implemented as virtual components executed by one or more virtual machines implemented in a virtual environment(s) hosted by the processing node(s) 1840. As will be appreciated by one of ordinary skill in the art, additional signaling or communication between the processing node(s) 1860 and the transceivers 1850 (if present) is used in order to carry out at least some of the desired functions.

It should be noted that the communication system 1300 may itself be connected to a host computer, which may be embodied in the hardware and/or software of a standalone server, a cloud-implemented server, a distributed server or as processing resources in a server farm. The host computer may be under the ownership or control of a service provider or may be operated by the service provider or on behalf of the service provider. Connections between the communication system 1000 and the host computer may extend directly from the core network 1340 to the host computer or may extend via an optional intermediate network such as 1330. The intermediate network 1330 may be one of, or a combination of more than one of, a public, private or hosted network. The intermediate network 1330, if any, may be a backbone network or the Internet. In some embodiments, the intermediate network 1330 may comprise two or more sub-networks (not shown).

The communication system 1300 as a whole may enable connectivity between one of the connected UEs 1310*a*, 1310*b* and the host computer. The connectivity may be described as an over-the-top (OTT) connection. The host computer and the connected UEs 1310*a*, 1310*b* are configured to communicate data and/or signaling via the OTT connection, using the access network (through the base stations 1320*a* and 1320*b*, for example), the core network 1340, any intermediate network 1330 and possible further infrastructure (not shown) as intermediaries. The OTT connection may be transparent in the sense that at least some of the participating communication devices through which the OTT connection passes are unaware of routing of uplink and downlink communications. For example, a network node 1320*a* may not or need not be informed about the past routing of an incoming downlink communication with data originating from a host computer to be forwarded (e.g., handed over) to a connected UE 1310*a*. Similarly, the network node 1320*a* needs not be aware of the future routing of an outgoing uplink communication originating from the UE 1310*a* towards the host computer.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or nonvolatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A primary Radio Link Control (RLC) entity, in a first network node, the primary RLC entity comprising a communication interface and a processing circuit communicatively connected to the communication interface, wherein the processing circuit is configured to:
receive packets from a Packet Data Convergence Protocol (PDCP) entity;
separate the received packets into a first group and a second group;
assign sequence numbers to the received packets of the first group from a sequence number range allocated to a secondary RLC entity from a second network node, the secondary RLC entity connected to the primary RLC entity through a RLC channel; and
send the received packets of the first group with the assigned sequence numbers to the secondary RLC entity, wherein the processing circuit is further configured to:
receive RLC acknowledgements for packet reception from a wireless device;
determine that the sequence numbers of the acknowledged packets belong to the sequence number range allocated to the secondary RLC entity; and
send the acknowledgements corresponding to the packets to the secondary RLC entity in response to the determining, wherein the packets have the sequence numbers in the sequence number range allocated to the secondary RLC entity.

2. The primary RLC entity of claim 1, wherein the processing circuit is configured to assign sequence numbers to the packets of the second group from a sequence number range allocated to the primary RLC entity.

3. The primary RLC entity of claim 2, wherein the processing circuit is configured to send the packets of the second group with the assigned sequence numbers to the wireless device.

4. The primary RLC entity of claim 1, wherein the processing circuit is configured to determine a split ratio for separating the received packets.

5. The primary RLC entity of claim 4, wherein the processing circuit is configured to determine the split ratio based on channel quality reports, received from the secondary RLC entity.

6. The primary RLC entity of claim 1, wherein the processing circuit is configured to add another secondary RLC entity to the primary RLC entity.

7. The primary RLC entity of claim 6, wherein the processing circuit is further configured to receive a measurement report from the wireless device and based on the measurement report determine that a new radio link from which the secondary RLC entity is based needs to be added.

8. The primary RLC entity of claim 6, wherein the processing circuit is further configured to send a reconfiguration message to the wireless device for configuring the radio link given by the secondary RLC entity.

9. The primary RLC entity of claim 1, wherein the processing circuit is further configured to establish a channel between the primary RLC entity and the secondary RLC entity.

10. The primary RLC entity of claim 1, wherein the processing circuit is further configured to remove the secondary RLC entity.

11. The primary RLC entity of claim 1, wherein the PDCP entity is connected to the primary RLC entity through a F1-User (F1-U) interface.

* * * * *